US012400772B2

(12) United States Patent
Salehi-Moghadam et al.

(10) Patent No.: US 12,400,772 B2
(45) Date of Patent: Aug. 26, 2025

(54) CAPACITIVE POWER TRANSMISSION CABLE

(71) Applicant: ENERTECHNOS LIMITED, Kingston Up-on-Thames (GB)

(72) Inventors: Mansour Salehi-Moghadam, Kingston-Up-on-Thames (GB); Gareth O'Brien, Ashbourne (IE); Dominic Quennell, London (GB); Ashkan Hajiloo, London (GB)

(73) Assignee: Enertechnos Limited, Surrey (GB)

( * ) Notice: Subject to any disclaimer, the term of this patent is extended or adjusted under 35 U.S.C. 154(b) by 423 days.

(21) Appl. No.: 17/776,711

(22) PCT Filed: Nov. 13, 2020

(86) PCT No.: PCT/GB2020/052908
§ 371 (c)(1),
(2) Date: May 13, 2022

(87) PCT Pub. No.: WO2021/094782
PCT Pub. Date: May 20, 2021

(65) Prior Publication Data

US 2022/0406489 A1 Dec. 22, 2022

(30) Foreign Application Priority Data

Nov. 15, 2019 (GB) ..................................... 1916715

(51) Int. Cl.
*H01B 9/04* (2006.01)
*H01B 3/08* (2006.01)
*H01B 9/00* (2006.01)

(52) U.S. Cl.
CPC ............ *H01B 9/006* (2013.01); *H01B 3/081* (2013.01); *H01B 9/04* (2013.01)

(58) Field of Classification Search
CPC . H01B 1/20; H01B 3/44; H01B 3/448; H01B 5/08; H01B 7/02; H01B 7/30;
(Continued)

(56) References Cited

U.S. PATENT DOCUMENTS 448,604 A * 3/1891 Conner .................... H01B 7/02
3,067,569 A * 12/1962 Kelley, Jr. ............ H01B 7/0009
156/271

(Continued)

FOREIGN PATENT DOCUMENTS

CN 105679450 A 6/2016
CN 205508493 U * 8/2016 ............ Y02A 30/14

(Continued)

OTHER PUBLICATIONS

Examination report under sections 12 & 13 of the Patents Act, 1970 and the Patents Rules, 2003 of the Intellectual property Office of India issued Jul. 25, 2024.

(Continued)

*Primary Examiner* — William H. Mayo, III
(74) *Attorney, Agent, or Firm* — Bay State IP, LLC

(57) ABSTRACT

A capacitive power transmission cable, having at least two sets of conductive strands, the sets of strands being insulated from each other and in capacitive relationship, the one with the other: wherein the conductive strands are laid at least substantially in a multiples of six layer structure, with substantially equal numbers of strands of both sets; each layer has strands of one set alternating with strands of the other set; and the strands of the respective sets have different contrasting color.

19 Claims, 6 Drawing Sheets

(58) Field of Classification Search

CPC .......... H01B 7/306; H01B 9/02; H01B 9/027; H01B 9/04; H01B 9/06; H01B 9/08; H01B 11/12

USPC .... 174/27, 33, 34, 36, 110 R, 113 R, 105 R, 174/105 SC, 106 R, 120 SC, 126.1, 126.2, 174/128.1, 128.2

See application file for complete search history.

(56) References Cited

U.S. PATENT DOCUMENTS

| | | | | | |
|---|---|---|---|---|---|
| 3,164,669 | A * | 1/1965 | Meyerhoff | H01B 7/303 | 174/114 R |
| 3,484,679 | A * | 12/1969 | Hodgson | H02J 3/1835 | 174/105 R |
| 4,125,741 | A * | 11/1978 | Wahl | H01B 7/0009 | 174/113 A |
| 4,204,129 | A * | 5/1980 | Hutchins, Jr. | H01B 7/30 | 307/146 |
| 6,376,775 | B1 * | 4/2002 | Leijon | H01F 27/34 | 174/128.1 |
| 9,589,704 | B2 * | 3/2017 | Gareis | H01B 13/0271 | |
| 2010/0200267 | A1 | 8/2010 | Baeck et al. | | |
| 2012/0103646 | A1 | 5/2012 | Fox et al. | | |
| 2012/0111602 | A1 | 5/2012 | Chih-Yin | | |
| 2021/0118593 | A1 * | 4/2021 | Cho | H01B 3/447 | |

FOREIGN PATENT DOCUMENTS

| | | | | |
|---|---|---|---|---|
| EP | 0848388 | A2 * | 10/1997 | H01B 7/28 |
| JP | S56089121 | U | 10/1985 | |
| JP | 2004303533 | A | 3/2003 | |
| JP | 2018147776 | A | 9/2018 | |
| KR | 10-2012/0084930 | | 1/2011 | |
| WO | WO 2019/234449 | A1 * | 12/2019 | H01B 7/30 |

OTHER PUBLICATIONS

International Search Report, European Patent Office, Apr. 20, 2021.

Written Opinion of the International Search Report, European Patent Office, Apr. 20, 2021.

Yang Yangdarwish: “Capacitive Transfer Cable and Its Performance in Comparison with Conventional Solid Insulated Cable,” IEEE Conference, Jun. 2019 (Jun. 2019), XP002801883.

* cited by examiner

CAPACITIVE POWER TRANSMISSION CABLE

CROSS REFERENCE TO RELATED APPLICATION

This application is for entry into the U.S. National Phase from which priority is claimed under all applicable sections of Title 35 of the United States Code including, but not limited to, Sections 120, 363, and 365 (c) to International Application No. PCT/GB2020/052908 filed on Nov. 13, 2020, and which in turn claims priority under 35 USC 119 to British Patent Application No. 1916715.4 filed on Nov. 15, 2019.

FIELD OF INVENTION

The present invention relates to a capacitive power transmission cable.

BACKGROUND OF THE INVENTION

U.S. Pat. No. 1,825,624 describes and claims:

1. In an electrical power transmission system, a source of alternating current, a receiving circuit, a transmission circuit for interconnecting said source and said receiving circuit and a distributed capacitance interposed in series relation with said transmission circuit and having a value sufficient substantially to neutralize the inductive reactance of said transmission circuit for increasing the power limit of said system.

The abstract of U.S. Pat. No. 4,204,129 is as follows:

This invention relates to the transmission of electric power and in particular provides an electric power-transmission system having reduced vector regulation, voltage drop, and power loss through the inclusion of capacitance in the cable in series between the generator and load by utilizing electric conductors, i.e., connective links, having capacitance distributed along the length of the cable. Such capacitance is achieved by dividing a conductor into two parts which are separated by dielectric material such that the two conductor parts are in capacitive relation along the length of the cable and by connecting one conductor part to the generator and the other conductor part to the load such that the distributed capacitance is in series with the generator and load.

In WO 2010/026380 there is described, in terms of its abstract and with reference to FIG. 1 hereof:

A charge transfer zero loss power and signal transmission cable comprising, eight lengths of an electric conducting material (18), being layered in alignment, one on top of the other, each of which can be electrically jointed to give any required length. Each of the conductive layers is separated from each other by alternate layers of a dielectric material (19). The conductive layers (10-17) are formed into a charging folded closed loop (20) and a discharging folded closed loop (21) with the apex of the fold (22) of each folded closed loops in opposition to each other, being the ends of the cable, are separated from each other by a dielectric material (19), thereby making capacitive contact and is the means to transfer an electric charge from the said charging loop to the discharging loop, thereby transmitting an alternating current from a power supply to a point of transmission, with substantially zero resistance, by the said two charging and discharging loops, thereby transmitting power from a power supply over a given distance, to a point of transmission with zero power loss.

SUMMARY OF THE INVENTION

It is surprising that such a capacitive cable is capable of transmitting data and/or power over a long distance with low, if not completely zero, loss. Our tests have confirmed this.

For this cable, the loop formation is taught to be essential. We believe that the loop formation is not essential.

Litz wires and Milliken conductors are known and consist respectively of fine wire strands and thicker wire strands insulated from each other, typically by so called "enamel" which is polymer based as used on magnet wire, and bundled together usually with twisting. They reduce skin effect which would reduce the conductive capacity of a single round conductor with the same amount of conductive material per unit length. In Milliken conductors, the wires are not always insulated from each other, particularly where they are arranged in six segments insulated from each other. The normal extent of insulation of the wires from each other in Milliken conductors is "light" [1].

[1] http://www.electropedia.org/iev/iev.nsf/display?openform&ievref=461-01-15

Litz wires and Milliken conductors are not suitable as such since the former are suitable for light duty and Milliken conductors have only light insulation.

In U.S. Pat. No. 3,164,669, there is described a similar cable, of which the strands are of half-hard copper wire for pulling into a pipe. Selected strands/wires are enamelled to reduce the overall skin effect in the cable. The arrangement described is:

Thus an effective construction in a 127-strand conductor might be the following:

Center wire—bare
6-wire layer—all wires enamelled
12-wire layer—alternating bare and enamelled
18-wire layer—all wires enamelled
24-wire layer—alternating bare and enamelled
30-wire layer—all wires enamelled
36-wire layer—alternating bare and enamelled FIG. 1 hereof is FIG. 2 of this US Patent. The patent emphasises:

In addition to the fact that the polyurethane enamel may be baked at a temperature which is lower than the temperature which would anneal the individual wires, the polyurethane enamel has the important advantage that it will decompose on application of a temperature of the order of molten solder (approximately 600°) and the products of decomposition have a fluxing action. Thus the concentrically stranded enamel conductor may the spliced simply and solder bonds effected with the usual equipment.

Leaving aside the feature of the strands/wires being some bare and some enamelled, we refer to the layer structure of 6,12,18,24,30,36 wires as the "multiples of six layer" structure, that is to say each layer have a multiple of six strands and each successive radially outer layer having another six strands.

In a Modern Power Systems paper entitled "Capacitative transfer promises significant reduction in losses" dated 15 May 2018 and available at http://www.modernpowersystems.com/features/featurescapacitative-transfer-promises-significant-reduction-in-losses-6150871/, there is described:

FIG. 2. A cross sectional representation of a Type III cable. Each of the individual bundles comprises 6 upstream electrodes (connected to supply) and 6 downstream electrodes (connected to load). Each bundle is composed of twisted, insulated wires and then the bundles are twisted as a group to form a cable which is then sheathed according to applicable international standards.

This "FIG. 2" is reproduced herein as FIG. 2. Please note that:

- the numbering in this FIG. 2 is 1 to 12 of the strands in each bundle of strands;
- this document is referred to below as "Document 6150821".

In our PCT/GB2019/051593, which is unpublished at the priority date of this application, we have described and claimed:

A capacitive power transmission cable comprising at least two sets of conductive strands, the sets of strands being insulated from each other and in capacitive relationship, the one with the other.

In a paper entitled "Capacitive Transfer Cable and Its Performance in Comparison with Conventional Solid Insulated Cable" given by Drs Yang Yang and Darwish at the IEEE conference in Calgary in June 2019, it is stated:

"CTS cables have been developed for different models but with the same function for series capacitive compensation. The main difference between the CTS cable and traditional cable is the dielectric inside the cables, There are two kinds of dielectric material used in a CTS cable. One is the insulation material that is the same as traditional cables. The other dielectric layer is applied between strands to compensate the inductive reactance in the main conductor to decrease the line impedance. FIG. 2 indicates an enamel-type CTS cable cross-section. Grey strands are the input wires; yellow strands are output wires . . . . Beyond the conductor, the other layers are the same as traditional cables."

FIG. 2 referred to here is FIG. 3 of the accompanying drawings. In it the latter, the named annotation has been replaced as follows:

| | |
|---|---|
| Outer sheath | A |
| Metallic sheath | B |
| Semi-conductive layer | C |
| Insulation | D |
| Semi-conductive layer | E |
| Input Strand conductor | F |
| Dielectric/enamel layer | G |
| Output strand conductor | H |

The object of the present invention is to provide an improved capacitive, power transmission cable utilising the multiples of six layer structure, According to a first aspect of the invention there is provided a capacitive power transmission cable, comprising:

- at least two sets of conductive strands, the sets of strands being insulated from each other and in capacitive relationship, the one with the other;

wherein:

- the conductive strands are laid at least substantially in a multiples of six layer structure, with substantially equal numbers of strands of both sets
- each layer has strands of one set alternating with strands of the other set and
- the strands of the respective sets have different contrasting colour.

Whilst it is envisaged that each layer can be comprised of bare strands one set alternating with one or more insulated strand of one or more further set(s); in the preferred embodiment, all strands have insulation on them, whereby each strand is insulated from all other strands, at least away from ends of the cable, i.e. long the length of the cable. Where there are bare strands, they can be identified by this.

Preferably the insulation on each strand will be of so called enamel typically of the sort used in so called "magnet wire". To aid identification of which strand belongs to which set, for capacitive connection, the strands of the respective sets are conveniently coated with different contrasting colours of enamel.

Whilst the two sets of strands can be wound with differing helical angles from one layer to the next, preferably the helical angles of one layer are equally and opposite that of the next.

Particularly where bare strands are provided in the cable, the layers can be insulated from each other by providing a wrapping of insulation between successive layers. Normally interlayer insulation will be provided where all the strands are provided with insulation on them.

Normally there will be equal numbers of strands of one set as the other. Nevertheless it is anticipated that a long cable may be made up of connected lengths of cable in which to one end the number of strands of one set will be reduced and the number of strands of the other set will be increased. This is to accommodate the majority of the current being carried by a connected one of the capacitive sets of conductive strands at respective ends of the long cable.

It is also anticipated that beyond two sets of strands, one or more other sets of conductive strands may be included. For instance in outer layers, in particular, where there are a multiple of four strands, the four sets can be connected as two pairs to give equal capacitive plate size in middle lengths of a long cable, whilst end lengths can be connected as three times as many strands of one, mainly conducting set, as the other, i.e. with reduced cable end capacitance per unit length. The strands in the layers can be provided in the sequence 1-2-3-4-1-2-3-4 etc. For this four different colours of enamel can be used for identification of the strands. In layers having a number of strands not divisible by four, such as the fifth layer, the strands can provided as slightly uneven in number, such as seven of two colours and 8 of the other two colours. With this lay-up, the bias of conductive strands can be provided in layers other than those whose strand count is strictly divisible by four.

Normally the multiples of six layer structure will be laid around a single central strand. This could be of a reinforcing material such as steel where the other strands are of copper or aluminium. However, the central strand will normally be of the same metal and insulated in the same manner as the other strands. It can be connected to one or other set of strands.

In certain layers the multiple of six structure may result in slight gaps in the strands. This is because in the absence of inter-layer insulation the circumference of the layers increases with their diameter, but in the presence of inter-layer insulations, the increase in diameter from one layer to the next is in proportion to the insulation thickness in addition to be the wire diameter, whereas the circumference is occupied by wires of their diameter alone. To accommodate this, certain layers may be provided with compensatory additional strands beyond their strict multiples of six layer structure number. This can be expected to provide a small order only difference in capacitance per unit length of the cable.

According to a second aspect of the invention there is provided a capacitive power transmission cable, comprising:

- at least two sets of conductive strands, the sets of strands being insulated from each other and in capacitive relationship, the one with the other;

wherein:

all the strand of one set are bundled together at respective ends of the cable, all the strand of another set are bundled together at respective ends of the cable and all the strands of the two, or more, sets remaining insulated from each other both along the length of the cable and at the respective ends of the cable.

Preferably the bundling provided electrical connection of the respective strands. Conveniently the bundling is effected by crimping of the respective strands together. The crimping renders fitting of inter-cable or end of cable connectors more convenient and easy when installing the cable such as in a muddy ditch.

Alternatively, the cable can be provided with the ends inserted into and clamped in respective connectors. In an advantageous embodiment, the cable is provided with crimped sets of strands at both ends and a connector at one end only. The connector can then receive and clamp the crimped strand ends of the next cable, at least where, as is normally the case, the cable will be provided as a number of lengths of cable shorter that the installed full length cable. The crimped ends of the length in question can be received and clamped in the connector of the previous length.

In the preferred embodiment of the second aspect of the invention:

the conductive strands are laid at least substantially in a multiples of six layer structure, with substantially equal numbers of strands of both sets and each layer has strands of one set alternating with strands of the other set.

BRIEF DESCRIPTION OF THE SEVERAL VIEWS OF THE DRAWINGS

To help understanding of the invention, two embodiments and a variant thereof will now be described by way of example and with reference to the accompanying drawings, in which.

DETAILED DESCRIPTION OF THE INVENTION

Figure 1:
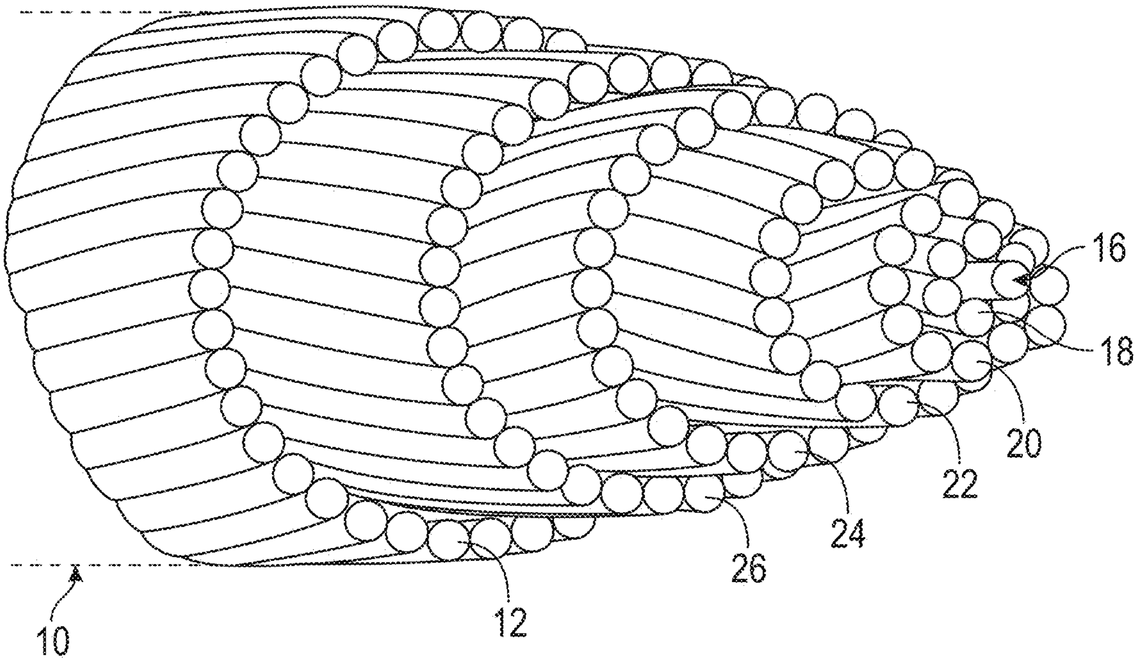
FIG. 1 is FIG. 2 of U.S. Pat. No. 3,164,669.
Figure 2:
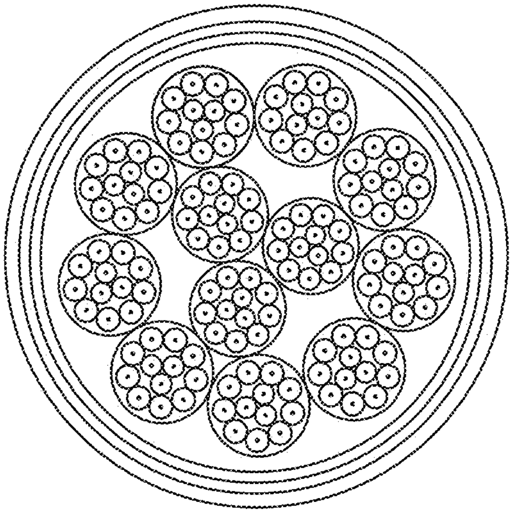
FIG. 2 is FIG. 2 of Document 6150821.
Figure 3:
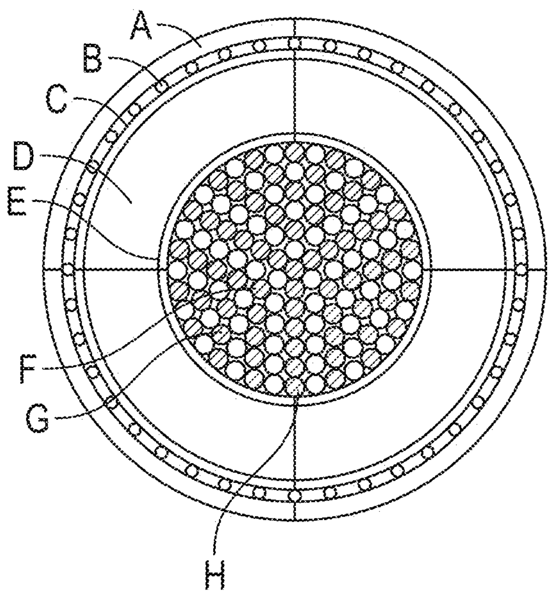
FIG. 3 is FIG. 2 of the above referenced 2019 IEEE paper.
Figure 4:
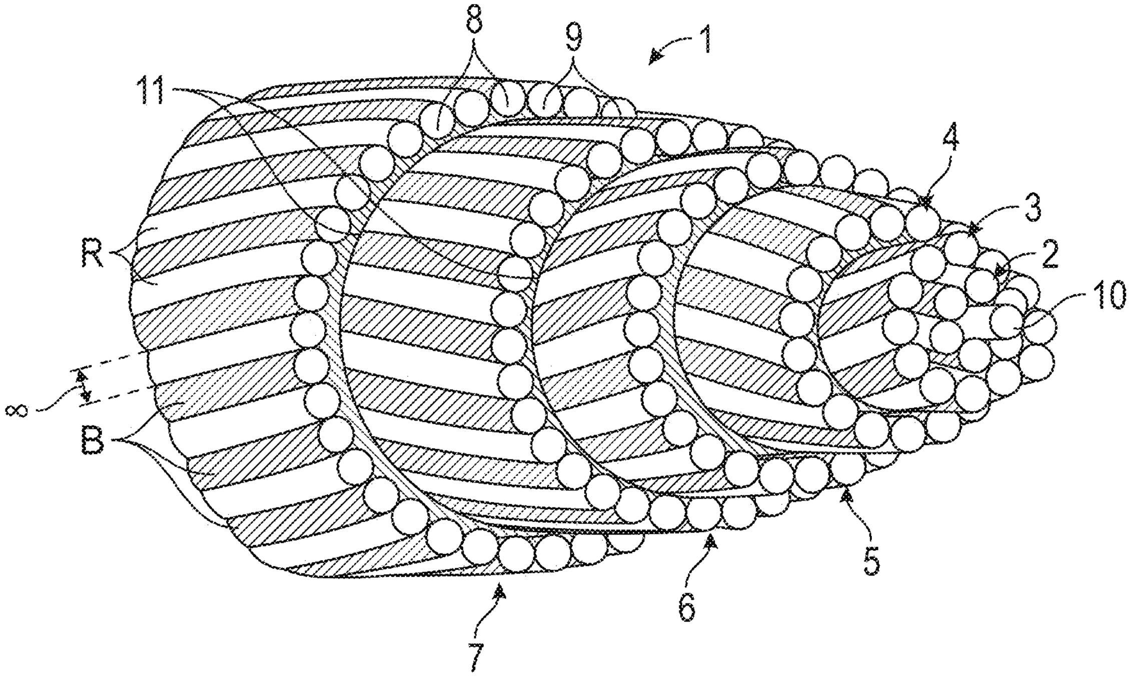
FIG. 4 is a view similar to FIG. 1 of a capacitive power transmission cable of the invention without external sheathing.
Figure 5:
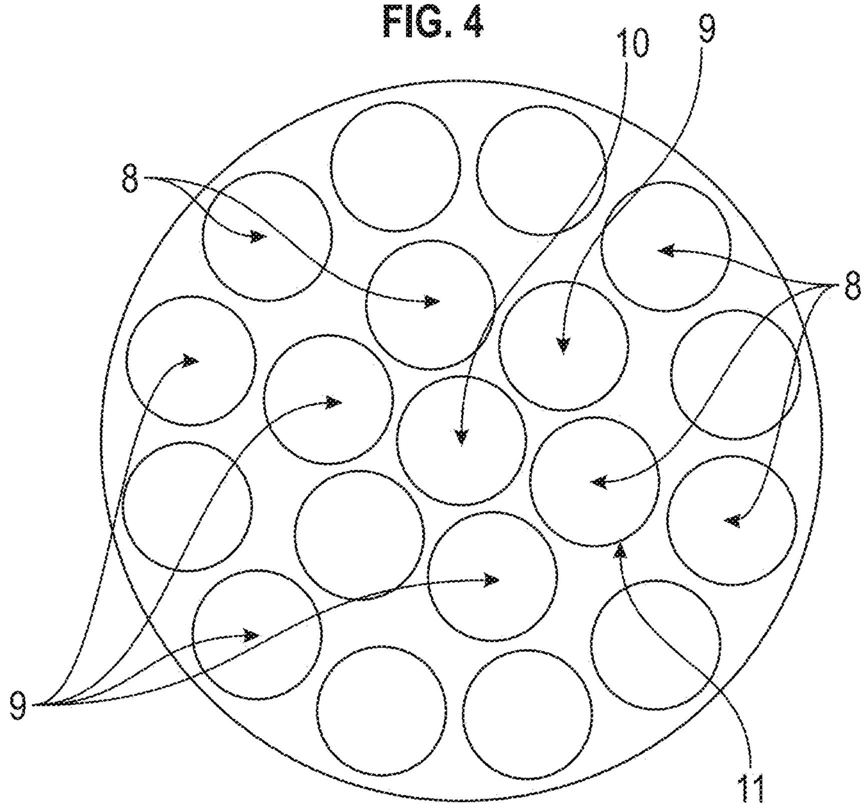
FIG. 5 is a scrap end view of the a central conductor two inner layers of conductors of the cable of FIG. 3.
Figure 6:
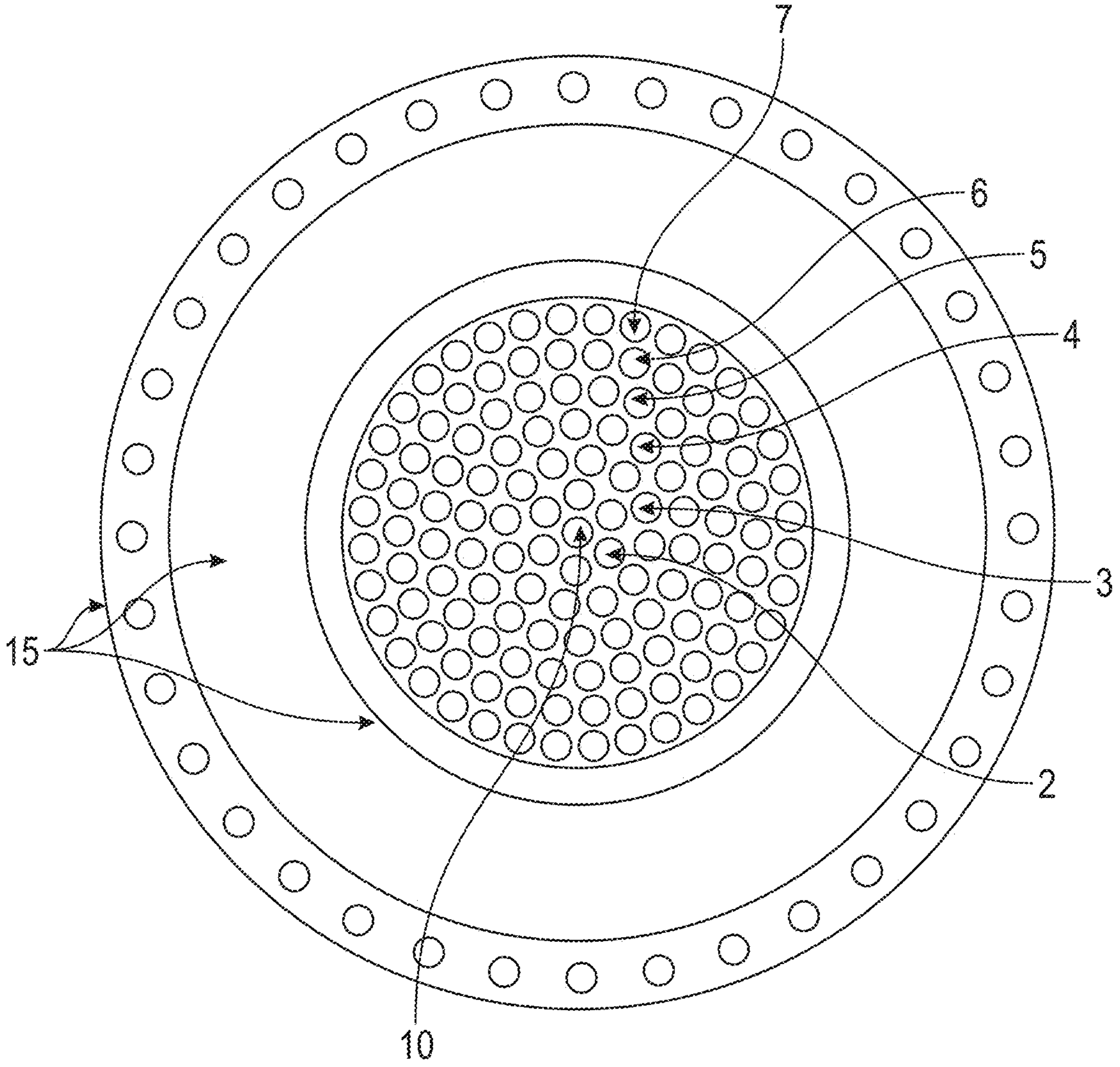
FIG. 6 is a full end view of the cable of FIG. 3 with external sheathing.

Referring to the drawings, a capacitive cable 1 comprises six layers 2,3,4,5,6,7 of two set of alternating copper strands 8,9.

The layers are laid around a single inner strand 10 of the same size, for example 13AWG-1.82 mmOD. This single strand, and each succeeding layer, is wound with soft insulation 11 which is displaces on winding maintain the relative positioning of the strands, squeezing into interstices between them. Typically this insulation is laid 40-45 mm thick of semi-conductive water blocking tape, typically including: polyester non-woven fabric, polypropylene super absorbent powder, semi-conductive carbon black, polyester non-woven fabric. Such tape being semi-conductive assists in electron distribution and thus enhances capacitance. However, we prefer to use fully insulating polyester or PET tape for interlayer insulation. The resultant capacitance per unit length of this cable is 45 nF/m.

The layer 2 has six strands 8,9, three of one set and three of the other set. Those of one set are of conventionally coloured, i.e. red/brown, magnetic wire enamel R. Those of the other set are of black coloured enamel B. The result of this colour contrast is that at and end of a cable length, with the strands exposed for respective connection, the sets of strands can be readily separated, with all the red/brown strands of one set being bundled for connection to one terminal 12 and all the black strands of the other set being collected for connection to another terminal 14 of a connector 16.

The layer 3 has six strands 8,9, six of one set and six of the other set. As with the layer 1, its strands of the two sets run parallel to each other and are therefore in good capacitive relation with each other. The strands of the two layers are at opposite helical angles α to each other. Whilst they cross like with like regularly, they also cross like with opposite equally regularly. Thus there is inter-layer capacitance between the sets of conductors as well as intra-layer capacitance. This contributes to the overall capacitance of the sets of strands within the cable when connected as above.

The successive layers 4-7 each have six more strands 8,9. There are always an even number and always strands of the two sets are interdigitated.

Normally there will be the six layers 2-7 plus the single central strand 10. The latter could be replaced by a steel strand or an inert polymeric strand. Outside the outer sixth layer, there will normally be the usual insulating, protective and outer layers 15 of underground power cable. There may be one or more fewer or additional layers of conductive strands for lesser or great power capacity.

Figure 7:
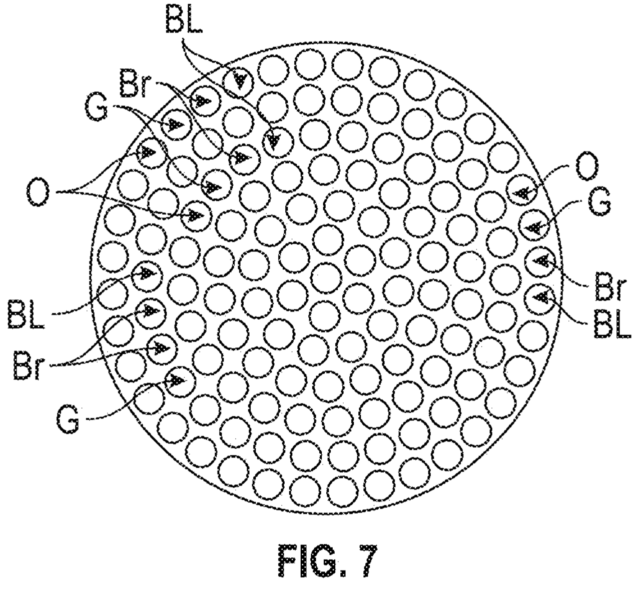
FIG. 7 is end view of the conductors only of a variant of the cable of FIG. 3.
Figure 8:
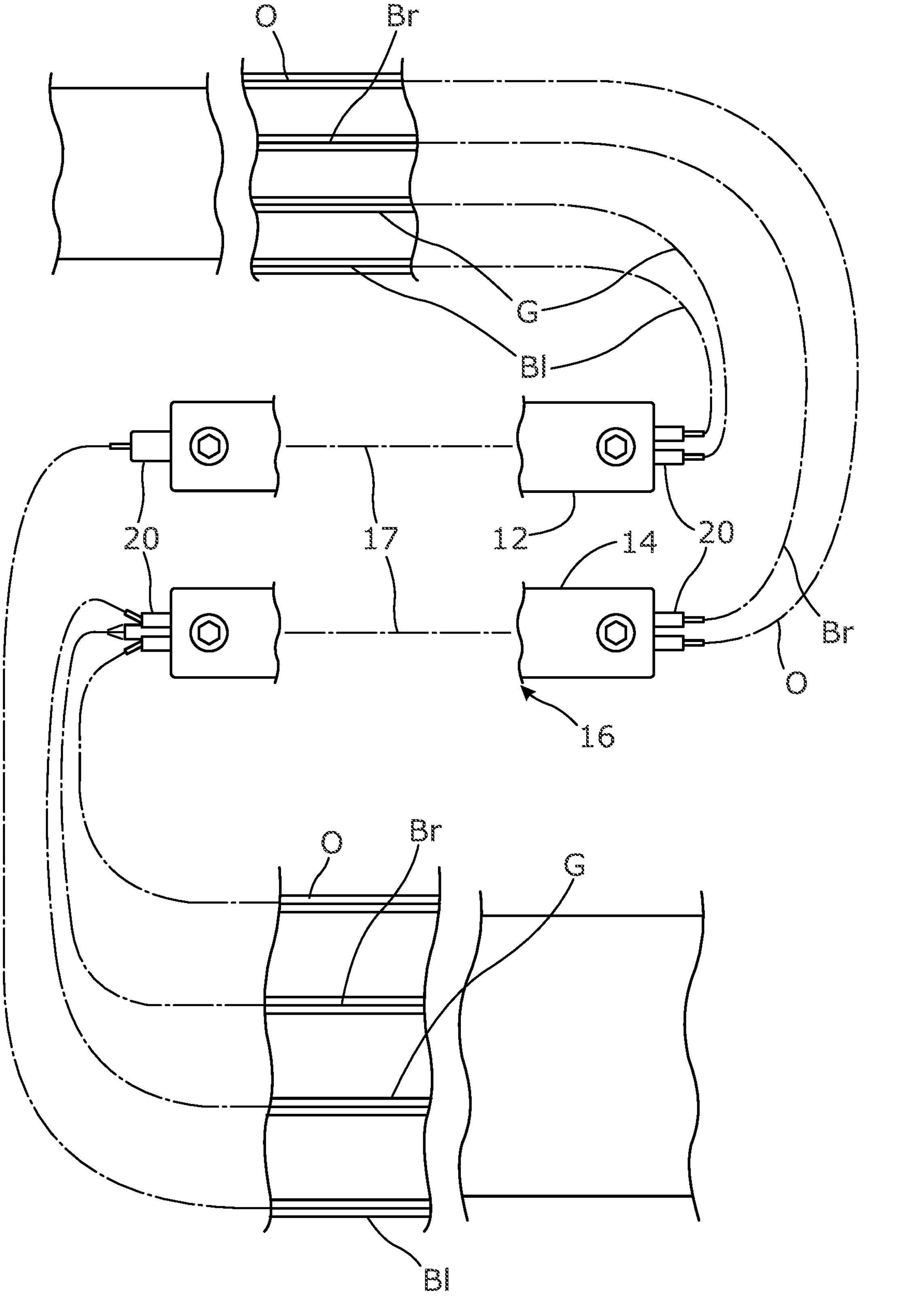
FIG. 8 is a diagrammatic view of a connection of middle to end lengths of the variant cable.
Figure 9:
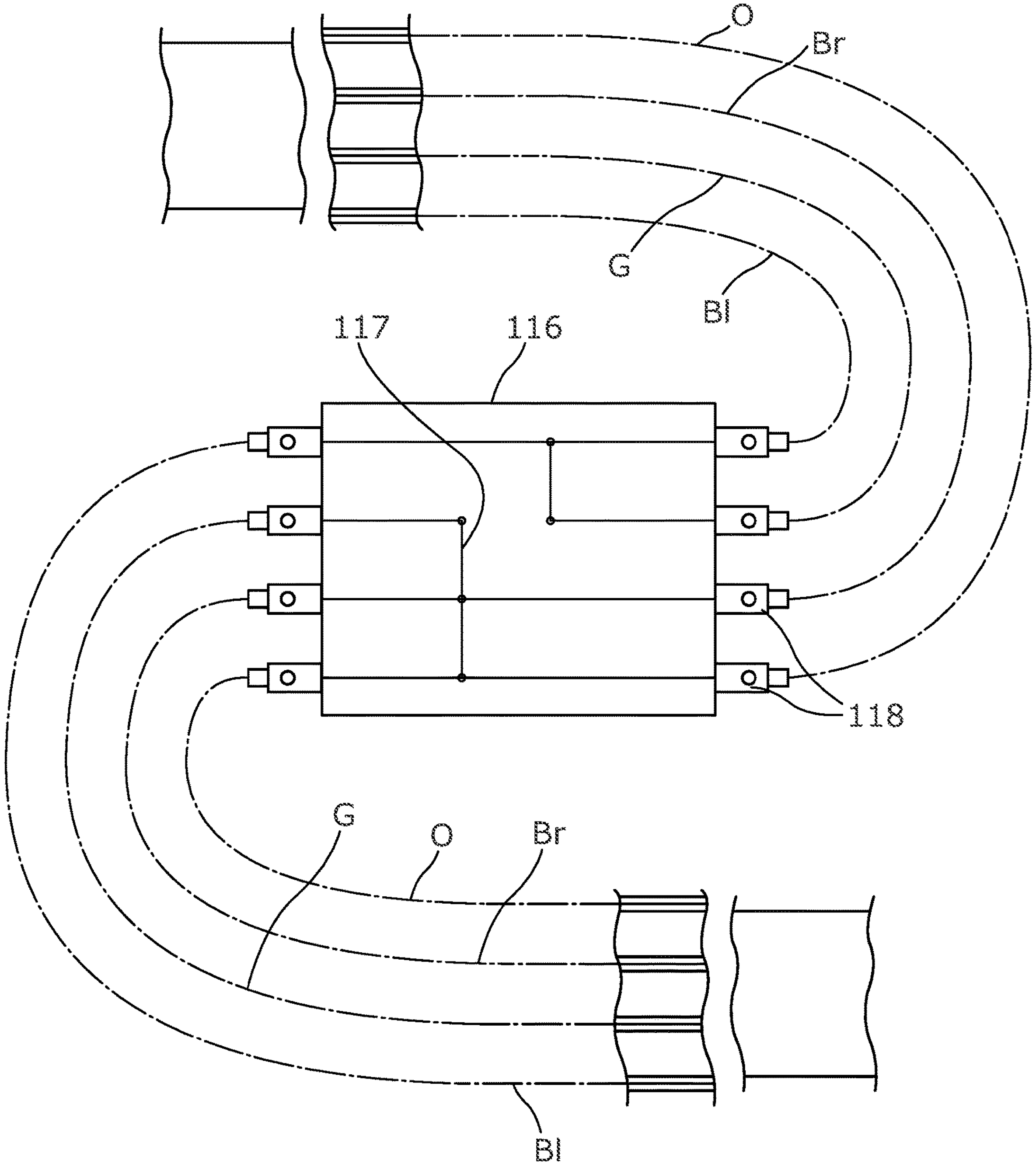
FIG. 9 is a similar diagrammatic view of another connection of middle to end lengths of the variant cable and FIG. 10 is a view similar to FIG. 3 of another cable of the invention.

As shown in FIG. 8 below in respect of a variant, the cable 1 can be supplied with its two sets of strands bundled together at both ends. The enamel can be removed from the very ends of the strands, typically by abrasion, and the respective bundled crimped together—ref 20 in FIG. 7. The cable can be supplied in this form or with the addition of a connector, having terminals for the crimped ends. Conveniently a connector can be provided at a single end only whereby in use, each cable length can be connected to a next one for assembly into a longer finished cable.

In end lengths of several connected lengths of the cable, the colouring of the strands may be varied, or indeed the colouring now described can be used throughout the cable. For connection, the strands of respective colours are exposed by cutting back of the outer sheath of the cable and the interlayer insulation. The exposed strands are bundled by colour, their enamelling exposed at extreme ends and the bundles secured by conductive metal crimps 120. This allows certain of the strands to be connected together as above, whilst others of the strands are differently connected. For instance, if the strands are coloured orange O, green G, brown Br, blue Bl and so on in that order, in the end length at one end, the green G strands can be connected at a connector 16 together with the orange O and brown Br strands, to reduce the capacitance with the blue Bl strands and increase the current capacity of the orange O and brown Br connected strands to be connected to a load. This connection is shown in FIG. 7. At the opposite end of the cable, the opposite connection is used. Thus the capacitor plate of the orange O and brown Br strands is in effect constant in plate area per unit length in the middle part of the cable, increased at the end to be connected to a load and reduced the supply end, where it is isolated. The green G/blue Bl plate is configured oppositely.

Where the connector 16 of FIG. 8 has straight through connections 17 from its respective terminals 12, 14 on either side, into which respective bundles of crimped wires as to be connected are inserted; the connector 116 of FIG. 8 has four respective terminals 118 for the differing colour strands and internal connections 117 for providing the desired grouping of the strands to provide end length conduction.

Again this colouring of the strands may be used throughout the thickness of the cable or at least in the layers having a multiple of four strands. If the order of the strands is orange, green, brown, blue and so on, the orange and brown strands can be connected together as if they were all one colour and the green and brown strands can be connected together as if they were all another colour. Thus cable is equivalent to that described above.

Figure 10:
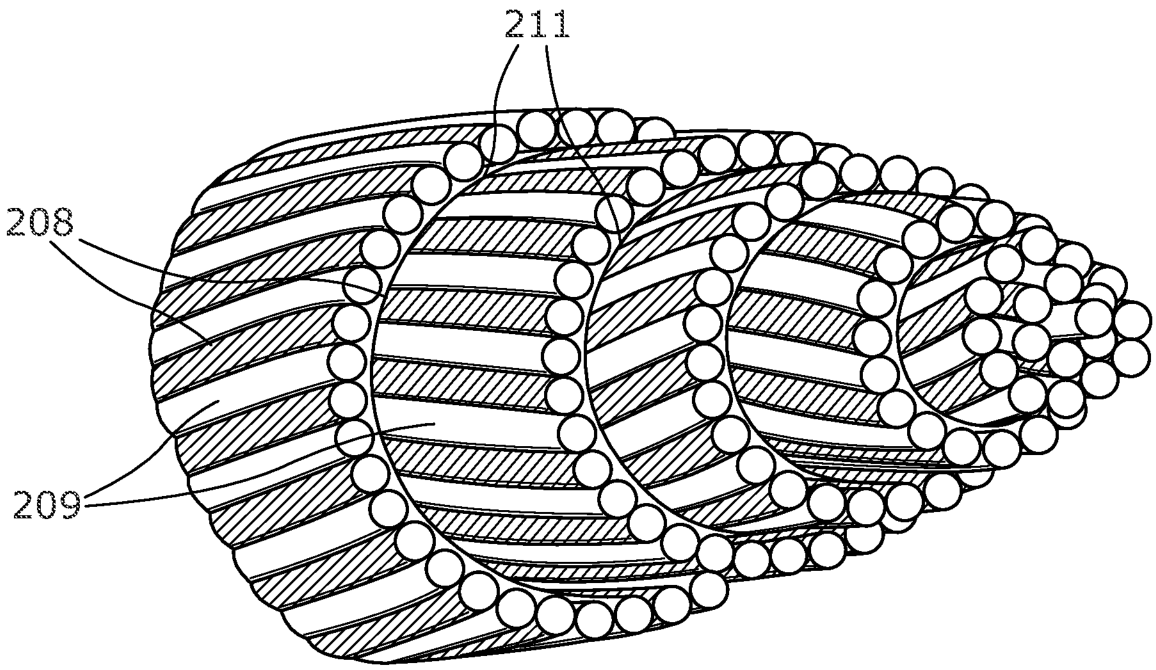

Turning now to FIG. 10, there is shown another cable of the invention (without outer sheathing). It has enamelled strands 208 in each of its layers, of which there are six, interdigitated with un-enamelled, bare strands 209. The enamelling of the strands 208 keeps them insulated from the bare strands 209, both within the layers and from one layer to the next. The bare strands may contact each other from one layer to the next, without effect on the capacitance between the sets of strands. However, interlayer insulation 211 is preferably provided.

Since the priority date of this application, we have now determined that the interlayer insulation is preferably of insulating only tape, without semi-conducting material. The latter is squeezed between respective opposite strands can provide a conductive path between them if each has a blemish in its enamel relatively close together. Local conductive paths between the cables conductors are possible in this way and are avoided by use of insulating tape only.

Where the relative permittivity of the tape is between 2 and 6, we prefer to use tape of 50 to 250 μm thickness. Where the relative permittivity of the tape is between 6 and 10, we prefer to use tape of 250 to 1000 μm thickness. We have found a suitable tape to use to be "Non-conductive water blocking tape—K3214, from Freudenberg Performance Materials SE & Co. KG, 69469 Germany. It comprises a non-conductive polyester nonwoven substrate with super absorbent powder, corrosion inhibitor and adhesive.

The invention claimed is:

1. A capacitive power transmission cable comprising a plurality of connected lengths of cable, wherein the lengths of cable comprise:

at least two sets of conductive strands, the sets of strands being insulated from each other and in capacitive relationship, the one with the other;

wherein:

the conductive strands are laid at least substantially in a multiples of six layer structure, with substantially equal numbers of strands of both sets, and each layer has strands of one set alternating with strands of the other set, wherein to one end of the capacitive power transmission cable the number of strands of one set is reduced and the number of strands of the other set is increased.

2. A capacitive power transmission cable as claimed in claim 1, wherein each layer is comprised of bare strands of one of the sets alternating with one or more insulated strand of one or more further set or sets.

3. A capacitive power transmission cable as claimed in claim 1, wherein all the strands of the at least two sets have insulation on them, whereby each strand is insulated from all other strands along the length of the cable.

4. A capacitive power transmission cable as claimed in claim 1 wherein the insulation on each strand is of enamel.

5. A capacitive power transmission cable as claimed in claim 1, wherein the strands of the respective sets have different contrasting colour.

6. A capacitive power transmission cable as claimed in claim 1, wherein the strands are laid with differing helical angles from one layer to the next.

7. A capacitive power transmission cable as claimed in claim 1, wherein the strands of one layer have helical angles equal and opposite those of the next layer.

8. A capacitive power transmission cable as claimed in claim 1, wherein inter-layer insulation is provided in addition to individual strand insulation.

9. A capacitive power transmission cable as claimed in claim 8, wherein the inter-layer insulation is non-conductive without super-conductive material.

10. A capacitive power transmission cable as claimed in claim 8, wherein the inter-layer insulation is of tape with a relative permittivity between 2 & 6 and a thickness of 50 to 250 μm.

11. A capacitive power transmission cable as claimed in claim 8, wherein the inter-layer insulation is of tape with a relative permittivity between 6 & 10 and a thickness of 250 to 1000 μm.

12. A capacitive power transmission cable as claimed in claim 1, including the said two sets of strands and one or more other sets of conductive strands.

13. A capacitive power transmission cable as claimed in claim 12, wherein in outer layers there are a multiple of four strands, the four sets can be connected as two pairs to give equal capacitive plate size in middle lengths of a long cable, whilst end lengths can be connected as three times as many strands of one, mainly conducting set, as the other, i.e. with reduced cable end capacitance per unit length.

14. A capacitive power transmission cable as claimed in claim 13, wherein in layers having a number of strands not divisible by four, the strands are provided as adjacent numbers of strands with one number of two different contrasting colours and an adjacent number of the other two different contrasting colours.

15. A capacitive power transmission cable as claimed in claim 1, wherein strands of four sets are laid in sequence 1-2-3-4-1-2-3-4 . . . etc., wherein the strands of the respective sets have four different colours that can be used for identification of the strands.

16. A capacitive power transmission cable as claimed in claim 1, including a single central strand of the same metal as and insulated in the same manner as the other strands.

17. A capacitive power transmission cable as claimed in claim 1, wherein certain layers are provided with compensatory additional strands beyond their strict multiples of six layer structure number.

18. A capacitive power transmission cable (1) as claimed in claim 1, including the said two sets of strands (8, 9) and one other set of conductive strands.

19. A capacitive power transmission cable (1) as claimed in claim 1, including the said two sets of strands (8, 9) and two other sets of conductive strands.

* * * * *